United States Patent

[11] 3,554,228

| [72] | Inventor | Raymond T. Schneider |
| | | Lakeland, Fla. |
| [21] | Appl. No. | 740,866 |
| [22] | Filed | June 28, 1968 |
| [45] | Patented | Jan. 12, 1971 |
| [73] | Assignee | Wellman-Lord, Inc. |
| | | a corporation of Florida |

[54] FLUID MIXING APPARATUS AND METHOD
5 Claims, 2 Drawing Figs.

[52] U.S. Cl............................................. 137/599,
137/604; 259/4; 261/78

[51] Int. Cl............................................. B01f 5/00,
C01b 21/42, C05c 1/00

[50] Field of Search............................... 137/599,
604, 1; 259/4, 95; 261/76, 77, 78; 23/1, 158; 71/59

[56] References Cited
UNITED STATES PATENTS
1,206,063  11/1916  Washburn.................... 23/158X

| 2,385,200 | 9/1945 | Friedel......................... | 23/1X |
| 2,739,036 | 3/1956 | Kamenjar et al.............. | 71/59X |
| 2,783,983 | 3/1957 | Benvenuti..................... | 261/78X |
| 3,230,972 | 1/1966 | Davis, Jr....................... | 137/599X |
| 3,276,753 | 10/1966 | Solt, et al..................... | 259/95 |

*Primary Examiner*—Robert G. Nilson
*Attorney*—Morton, Bernard, Brown, Roberts & Sutherland

ABSTRACT: A method of and an apparatus for mixing fluids. A first fluid is introduced into a fluid zone defined by a cylindrical shell. A second fluid is introduced into a plurality of pipes passing through the fluid zone at a pressure lower than that of the first fluid. Each pipe has a small passageway through its wall through which the first fluid enters due to the pressure difference. The two fluids then mix during passage from the fluid zone within the pipes.

PATENTED JAN 12 1971

3,554,228

INVENTOR
RAYMOND T. SCHNEIDER

BY McLean, Morton & Boustead
ATTORNEYS

FLUID MIXING APPARATUS AND METHOD

The present invention pertains to fluid mixing. More particularly, the present invention pertains to a method of and an apparatus for mixing fluids with minimum residence time within the mixer and a minimum of pressure drop.

Numerous requirements exist for fluid mixers capable of thoroughly mixing two or more fluids within a system having rigid pressure requirements. Thus, for example, in the manufacture of nitric acid by ammonia oxidation processes, the mixing of gases such as ammonia and air is required. In other processes the mixing of liquids is required. Efficient operation of such a system requires a thorough mixing of the fluid constituents with a minimum of pressure drop.

While many fluid mixers are presently available, generally those which are capable of thoroughly mixing fluids result in an undesirably great pressure drop with a resulting low efficiency. Other mixers operate with less pressure drop but do not provide the degree of mixing required in numerous processes.

The present invention is a fluid mixer in which a thorough mixing of fluids takes place with a minimum residence time and a minimum pressure drop. The mixer includes an outer shell defining a fluid zone through which a large number of small cross-sectional conduits, e.g. tubes, pass, each tube including an opening or passageway through its side within the shell. The fluid constituent with the higher permissible pressure drop is introduced into the shell surrounding the tubes. The other fluid is caused to flow through the tubes. The higher pressure causes the first fluid to pass through the passageway in each tube. The two fluids then mix as they flow through the tubes and out of the fluid zone. The size of the passageways in the tube walls is selected to permit passage of the fluid therethrough with only the additional pressure drop available from the higher pressure of that fluid. Since the fluids are divided into a large number of parts, complete mixing is obtained with only a low pressure drop over the mixer.

These and other aspects and advantages of the present invention are apparent in the following detailed description and claims, particularly when read in conjunction with the drawings in which like parts bear like reference numerals.

Figure 1:
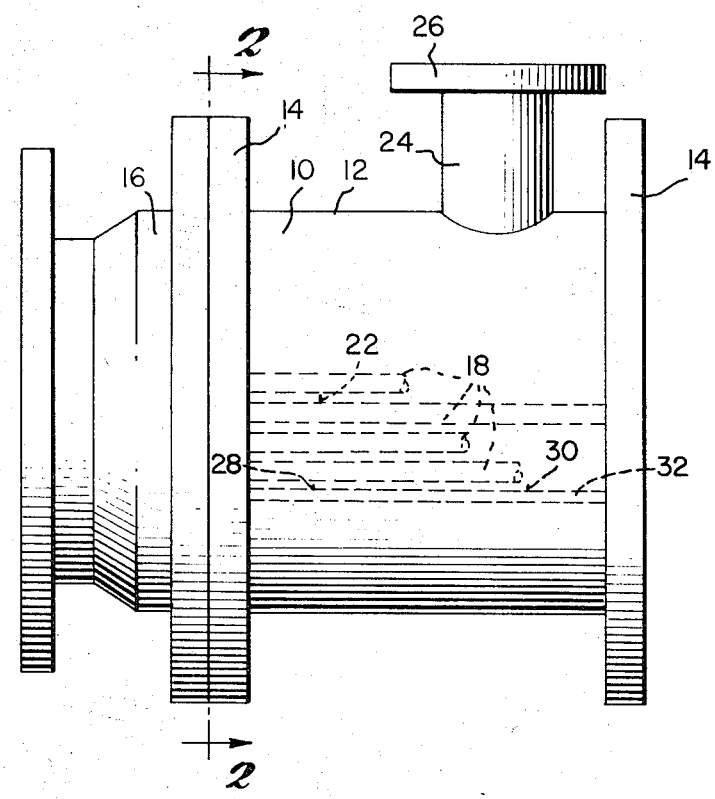
FIG. 1 is an elevational view of the apparatus of the present invention.
Figure 2:
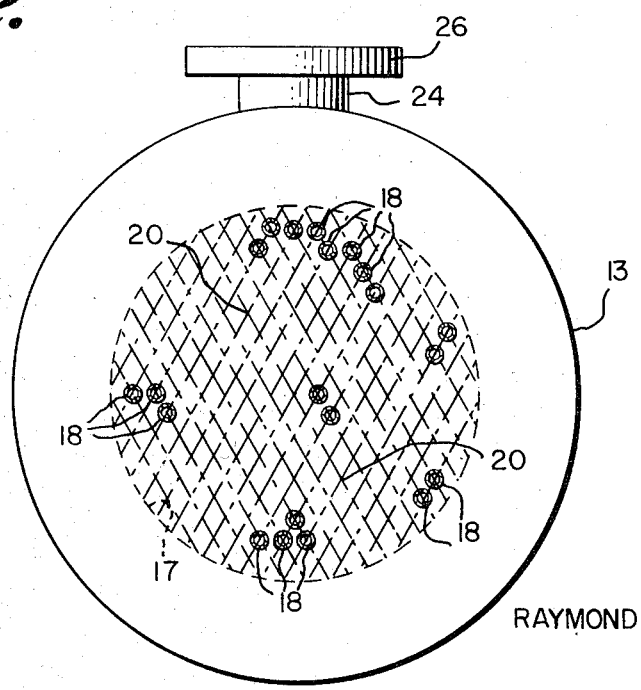
FIG. 2 is a view of the apparatus of the present invention taken along line 2—2 of FIG. 1.

Fluid mixer 10 depicted in FIGS. 1 and 2 includes a cylindrical outer shell 12 formed of a rigid noncorrosive pressure-resistant material such as stainless steel. The dimensions of shell 12 are determined by the particular application. In a representative example, a length in the order of 18 inches and a diameter in the order of 12 inches might be utilized. Each end of shell 12 is closed by a closure plate 13 which conveniently might include a flange 14 to permit attachment of shell 12 to other processing equipment. Thus, as depicted in FIG. 1, the inlet end of shell 12 is attached by means of flange 14 to inlet coupling 16.

Passing through each closure plate 13 and through the zone 17 within shell 12 are a large number of tubes 18 which, for example, might each be stainless steel tubes having a diameter in the order of three-fourths inch. FIG. 2 shows several of the tubes 18; however, for the sake of clarity, most of the tubes 18 are not shown in FIG. 2 but their locations are represented by the line intersections 20. Each tube 18 is supported at either end by closure plates 13.

Each tube 18 has a small opening or fluid passageway through its wall at a point near the inlet end of shell 12. Thus, each tube 18 includes an opening at a point designated in FIG. 1 by reference numeral 22 which, in a shell having a length of 18 inches, might be in the order of 3 inches from the tube inlet. The diameter of this opening is determined by the amount of pressure drop desired by the fluid which is to pass through it. Illustratively, openings having a diameter in the order of five thirty-seconds inch might be provided.

Inlet member 24 extends into shell 12 to permit introduction of a fluid into fluid zone 17 within shell 12 surrounding the tubes 18. To facilitate attachment of inlet member 24 to other processing equipment, it might terminate in a connecting flange 26.

The fluids to be mixed might be gases or liquids or a gas and a liquid. The fluid which can accommodate the higher pressure drop, for example ammonia, is introduced through inlet 24 to the first fluid zone 17 inside of shell 12 and around each tube 18. The second fluid, for example air, is introduced through inlet coupling 16 into each tube 18. The ammonia in zone 17 is at a higher pressure than is the air in tubes 18. This pressure difference is great enough to cause the ammonia to flow through passageway 22 at the desired flow rate. Thus, for example, the pressure difference might be more than 5 p.s.i. and preferably about 10 p.s.i. The higher pressure ammonia thus passes through the fluid passageways 22 to enter each tube 18. As the two fluids move through the remainder of tubes 18, thorough mixing is achieved. The mixed fluids then pass from mixer 10 to the remainder of the processing apparatus. The large number and close spacing of the several tubes 18 divides the fluids into a great number of parts. Preferably, each of these parts into which the two fluids are divided are made substantially equal by having the tubes 18 of the same internal diameter and by having fluid passageways 22 of uniform diameter. This dispersal of the fluids results in substantially complete mixing of the fluids with only a low drop in pressure. Consequently, little energy is lost in the mixer. The greater the number of substantially equal parts into which the two fluids are divided, the greater the dispersal of the fluids, and thus the better the mixing that is achieved.

As another example, gaseous ammonia is introduced into zone 17 via inlet member 24, and liquid ammonium nitrate solution is introduced through inlet coupling 16 into each tube 18. By this method an ammonium nitrate ammonia fertilizer can be produced having a high nitrogen concentration, for example a concentration in excess of 40 percent. In another operation, liquid urea solution is introduced through inlet member 24 and liquid ammonium nitrate solution is introduced through inlet coupling 16 to produce liquid fertilizer. In this operation it may be desirable to provide a plurality of passageways in each tube 18 passageways 28 and 30 in tube 32 to provide adequate flow area for the volumes required.

Although the present invention has been described with preference to preferred embodiments, numerous modifications could be made and still the resulting apparatus would be within the scope of the invention.

I claim:

1. Fluid mixing apparatus comprising a cylindrical shell having first and second ends; first and second closure plates attached to said first and second ends, respectively, for closing said ends to define a first fluid zone within said shell; means for introducing a first fluid into said first fluid zone; and a plurality of conduits passing through said first fluid zone and supported by said first and second closure plates, said plurality of conduits adapted to carry a second fluid therethrough, each conduit having a fluid passageway through its wall and within said first fluid zone to permit said first fluid to flow from said first fluid zone into said conduits to mix with said second fluid.

2. Fluid mixing apparatus comprising means defining a first fluid zone; means for introducing a first fluid into said first fluid zone; and a plurality of discrete tubular conduits passing through said first fluid zone and distributed over the entire cross section of said first fluid zone, said tubular conduits adapted to carry a second fluid therethrough, each tubular conduit having a fluid passageway through its wall and within said fluid zone to permit said first fluid to flow from said first fluid zone into said tubular conduits to mix with said second fluid.

3. Apparatus as claimed in claim 2 in which each tubular conduit has substantially the same internal diameter and in which the passageways are of substantially uniform diameter.

4. Apparatus as claimed in claim 2 in which each tubular conduit has a plurality of fluid passageways through its wall and within said fluid zone.

5. Fluid mixing apparatus as claimed in claim 2 in which the plurality of discrete tubular conduits are distributed substantially uniformly over the entire cross section of the first fluid zone.